United States Patent
Alger, II et al.

(10) Patent No.: US 8,291,891 B2
(45) Date of Patent: Oct. 23, 2012

(54) EGR SYSTEM WITH DEDICATED EGR CYLINDERS

(75) Inventors: Terrence Francis Alger, II, San Antonio, TX (US); Barrett Wade Mangold, Atascosa, TX (US); Jess Witman Gingrich, San Antonio, TX (US); Darius Mehta, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 12/140,878

(22) Filed: Jun. 17, 2008

(65) Prior Publication Data

US 2009/0308070 A1    Dec. 17, 2009

(51) Int. Cl.
*F02B 47/08* (2006.01)
*F02M 25/07* (2006.01)

(52) U.S. Cl. .................. 123/568.11; 123/58.8; 123/315; 701/108; 60/278

(58) Field of Classification Search ............. 123/568.11, 123/58.8, 315, 568.17; 701/108; 60/278, 60/280, 288, 605.1, 605.2
See application file for complete search history.

(56) References Cited

U.S. PATENT DOCUMENTS

| | | | |
|---|---|---|---|
| 3,156,162 A | 11/1964 | Wallace et al. | 92/82 |
| 3,303,831 A | 2/1967 | Sherman | 123/48 |
| 3,405,679 A | 10/1968 | Norris et al. | 118/2 |
| 3,405,697 A | 10/1968 | Marchand | 123/78 |
| 3,805,752 A | 4/1974 | Cataldo | 123/75 R |
| 3,924,576 A | 12/1975 | Siewert | 123/1 |
| 3,941,113 A | 3/1976 | Baguelin | 123/179 R |
| 4,108,114 A | 8/1978 | Kosaka et al. | 123/3 |
| 4,131,095 A * | 12/1978 | Ouchi | 123/58.8 |
| 4,179,892 A * | 12/1979 | Heydrich | 60/605.2 |
| 5,178,119 A | 1/1993 | Gale | 123/570 |
| 5,257,600 A | 11/1993 | Schechter et al. | 123/78 B |
| 5,456,240 A | 10/1995 | Kanesaka | 123/565 |
| 5,517,976 A | 5/1996 | Bachle et al. | 213/569 |
| 5,894,726 A | 4/1999 | Monnier | 60/274 |
| 6,009,709 A | 1/2000 | Bailey | 60/605.2 |
| 6,138,650 A | 10/2000 | Bailey | 123/568.12 |
| 6,286,489 B1 * | 9/2001 | Bailey | 123/568.11 |
| 6,425,381 B1 | 7/2002 | Rammer | 123/568.12 |
| 6,484,702 B1 | 11/2002 | Riley | 123/568.11 |

(Continued)

FOREIGN PATENT DOCUMENTS

GB    2 110 791 A1    11/1982

(Continued)

OTHER PUBLICATIONS

International Search Report with Written Opinion, PCT/US05/40483, 12 pages. Oct. 2, 2006.

(Continued)

*Primary Examiner* — Mahmoud Gimie
*Assistant Examiner* — David Hamaoui
(74) *Attorney, Agent, or Firm* — Chowdhury & Georgakis PC; Ann C. Livingston

(57) ABSTRACT

Improved exhaust gas recirculation system and methods that use one or more of the engine's cylinders as dedicated EGR cylinders. All of the exhaust from the dedicated EGR cylinders is recirculated back to the engine intake. Thus, the EGR rate is constant, but the EGR mass flow may be controlled by adjusting the air-fuel ratio of the dedicated EGR cylinders or by using various variable valve timing techniques.

14 Claims, 4 Drawing Sheets

U.S. PATENT DOCUMENTS

| | | | |
|---|---|---|---|
| 6,536,392 B2 | 3/2003 | Widener | 123/179.19 |
| 6,655,324 B2* | 12/2003 | Cohn et al. | 123/1 A |
| 6,742,507 B2* | 6/2004 | Keefer et al. | 123/585 |
| 6,789,531 B1* | 9/2004 | Remmels | 123/568.11 |
| 6,820,415 B2* | 11/2004 | Abet et al. | 60/286 |
| 6,871,642 B1* | 3/2005 | Osterwald | 123/568.11 |
| 6,877,492 B1* | 4/2005 | Osterwald | 123/568.11 |
| 7,290,504 B2* | 11/2007 | Lange | 123/1 A |
| 7,389,770 B2* | 6/2008 | Bertilsson et al. | 123/568.17 |
| 7,721,541 B2* | 5/2010 | Roberts et al. | 60/605.2 |
| 7,945,376 B2* | 5/2011 | Geyer et al. | 701/108 |
| 2002/0189598 A1 | 12/2002 | Remmels et al. | 123/568.11 |
| 2003/0121484 A1* | 7/2003 | Wang | 123/90.16 |
| 2004/0099256 A1 | 5/2004 | Stewart | 123/568.11 |
| 2005/0022450 A1* | 2/2005 | Tan et al. | 48/198.3 |
| 2006/0112940 A1* | 6/2006 | Roberts et al. | 123/568.11 |
| 2007/0193270 A1 | 8/2007 | Roozenboom et al. | 60/612 |
| 2009/0199825 A1* | 8/2009 | Piper et al. | 123/568.21 |
| 2011/0041495 A1* | 2/2011 | Yager | 60/605.2 |

FOREIGN PATENT DOCUMENTS

JP     11-247665 A     9/1999

OTHER PUBLICATIONS

International Preliminary Report on Patentability PCT/US2005/040483, 8 pages. May 18, 2007.

* cited by examiner

EGR SYSTEM WITH DEDICATED EGR CYLINDERS

TECHNICAL FIELD OF THE INVENTION

This invention relates to internal combustion engines, and more particularly to an improved exhaust gas recirculation system for such engines.

BACKGROUND OF THE INVENTION

For control of internal combustion engines, three important control parameters are spark timing (or fuel injection timing in a diesel engine), the exhaust gas recirculation (EGR) rate, and the air/fuel ratio (AFR). Control of spark timing or injection timing affects the timing of the initiation of the combustion process. Control of EGR and AFR affects the speed and duration of the combustion process.

The AFR is often controlled by an exhaust oxygen sensor to produce a desired AFR in a closed loop system. EGR is generally controlled by a combination of different parameters such as exhaust backpressure, engine coolant temperature, engine speed, throttle position or manifold pressure and has proven difficult to control accurately. Spark or injection timing is generally determined from a stored table indexed by engine speed and load parameters which may build in retard in response to a knock, MAP or throttle movement detector.

To implement EGR, a fraction of the exhaust gases are recycled through a control valve from the exhaust to the engine intake system. The recycled exhaust gas is usually mixed with the fresh fuel-air mixture. EGR can be implemented in internal and external configurations. External configurations can be implemented as either a high pressure or loop pressure loop, depending on whether the recirculated exhaust is introduced to the intake post compressor (high pressure loop) or pre-compressor (low pressure loop).

EGR has a long history of use in both diesel and spark-ignited engines for reduction of NOx emissions. It affects combustion in several ways. The combustion is cooled by the presence of exhaust gas, that is, the recirculated exhaust gas absorbs heat. The dilution of the oxygen present in the combustion chamber reduces the production of NOx. Also, if exhaust gas is being recirculated, less air is breathed by the engine, so reducing the amount of exhaust gas produced.

As a relatively simple and low cost technology, EGR can be expected to be widely used on all types of engines. Of particular interest is that EGR can reduce the need for fuel enrichment at high loads in turbocharged engines and thereby improve fuel economy.

DETAILED DESCRIPTION OF THE INVENTION

The following description is directed to various configurations of an EGR system implemented in an internal combustion engine system. One or more cylinders of the internal combustion engine is used to generate the exhaust gas that will be recirculated and used as a diluent for the intake charge of the entire engine. The use of one or more cylinders to generate its entire output of exhaust for recirculation is referred to herein as use of "dedicated EGR cylinder(s)".

Figure 1:
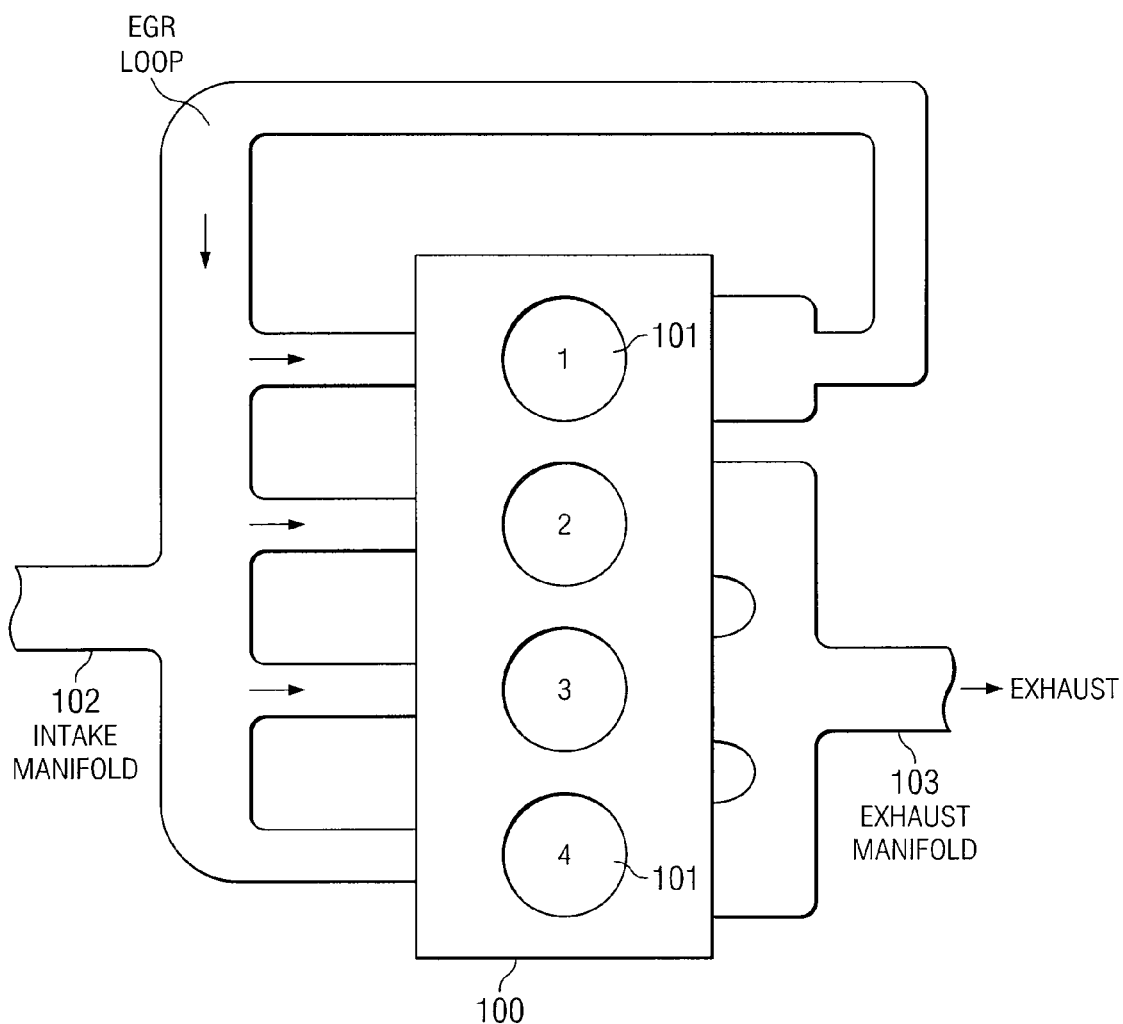
FIG. 1 illustrates an example of an internal combustion engine having one dedicated EGR cylinder.

FIG. 1 illustrates an internal combustion engine 100 having four cylinders 101 (referenced as cylinders 1-4). One of the cylinders 101 is a dedicated EGR cylinder, that is, 100% of its exhaust is recirculated back to the intake manifold. The exhaust of the other three cylinders 101 is directed to an exhaust system. In this example, the engine is said to have "25% dedicated EGR" because one of its four cylinders has 100% of its exhaust redirected to the intake manifold 102.

Experiments have shown that if the exhaust from one or more cylinders is redirected into the intake manifold, and that cylinder is run at rich of stoichiometric A/F ratios ($\Phi > 1.0$), the EGR tolerance of the engine increases while the overall fuel consumption decreases. Further research has shown that if the dedicated EGR cylinder is run rich of stoichiometric, a significant amount of H2 and CO are formed, both of which can promote increased EGR tolerance by increasing burn rates, increasing the dilution limits of the mixture and reducing quench distances.

Although not explicitly illustrated in FIG. 1, it is assumed that engine 100 has a turbocharger, which is located after the exhaust manifold 102 and before the intake manifold 103.

Figure 2:
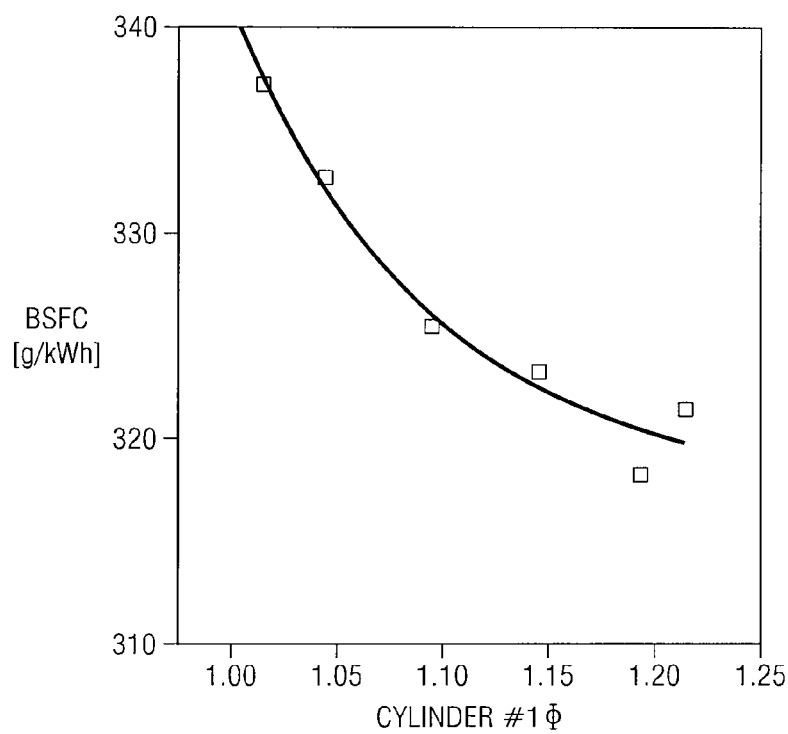
FIG. 2 illustrates fuel consumption results for an engine having 25% dedicated EGR.

FIG. 2 illustrates, for an engine with 25% dedicated EGR, such as engine 100, fuel consumption results at 2000 rpm/2 bar bmep (brake mean effective pressure). At low loads, as the equivalence ratio of the dedicated cylinder (cylinder #1) increases, more hydrogen (H2) gas is produced, the engine's stability improves, and fuel consumption decreases. Fuel consumption is plotted as values of brake specific fuel consumption (BSFC).

Figure 3:
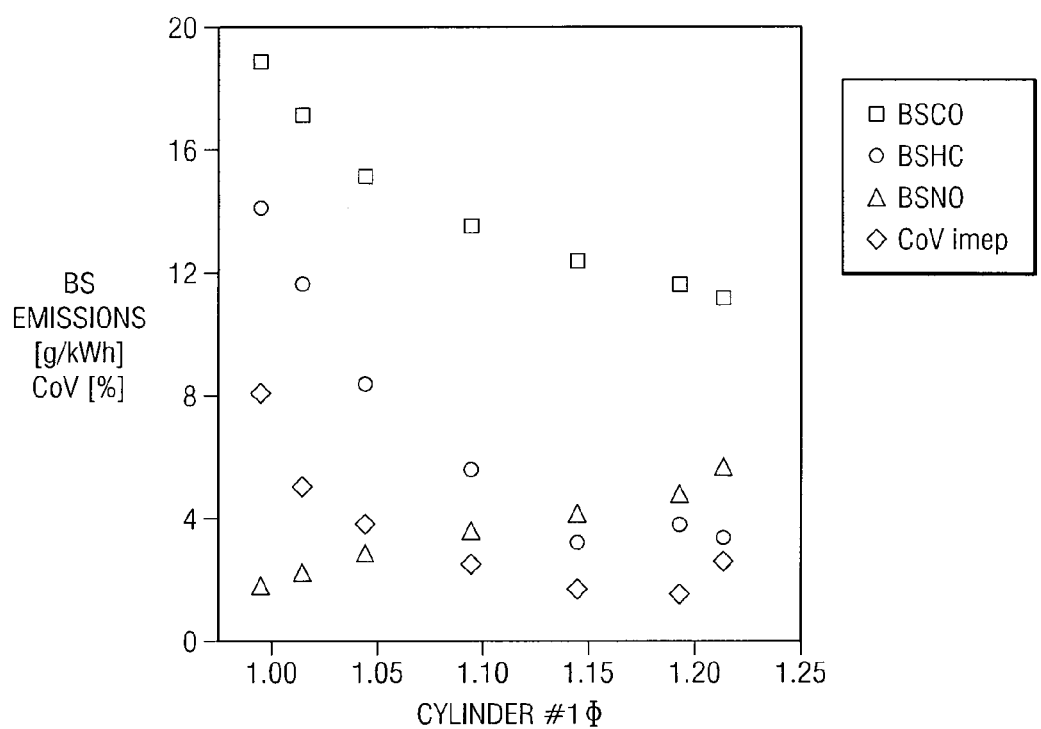
FIG. 3 illustrates emissions and engine stability results for an engine having 25% dedicated EGR.

FIG. 3 illustrates emissions results for an engine having 25% dedicated EGR, also at 2000 rpm/2 bar bmep. The additional H2 promotes more rapid and complete combustion, which results in lower CO and HC emissions from the non-dedicated cylinders (cylinders #2-4). The "CoV imep", an engine operation parameter referring to the coefficient of variation of indicated mean effective pressure, is also reduced. It is assumed that the non-dedicated cylinders run at $\Phi = 1.0$ and are connected to a 3-way emissions reduction catalyst. The NO emissions from these cylinders increase slightly, due to improved combustion and the hotter temperatures it brings, but the increased amount was much less than for an engine without EGR.

In addition, engine 100 also performed better at knock limited conditions, improving low speed, peak torque results, due to increased EGR tolerance and the knock resistance provided by H2 and CO.

In the case of the example engine of FIG. 1, the estimated level of H2 gas that can be generated is approximately 0.5% of the fuel mass at $\Phi = 1.2$. IN addition to improving performance, the dedicated EGR system is also beneficial in that the EGR level remains constant and is therefore much easier to control, eliminating the need for specialized sensors and control algorithms.

An engine, as configured in FIG. 1 with 25% EGR, runs well at low engine speeds. However, at some conditions, such an engine could benefit from higher EGR levels than 25%. The increased EGR could be further enhanced if the additional EGR were supplemented with H2.

Figure 4:
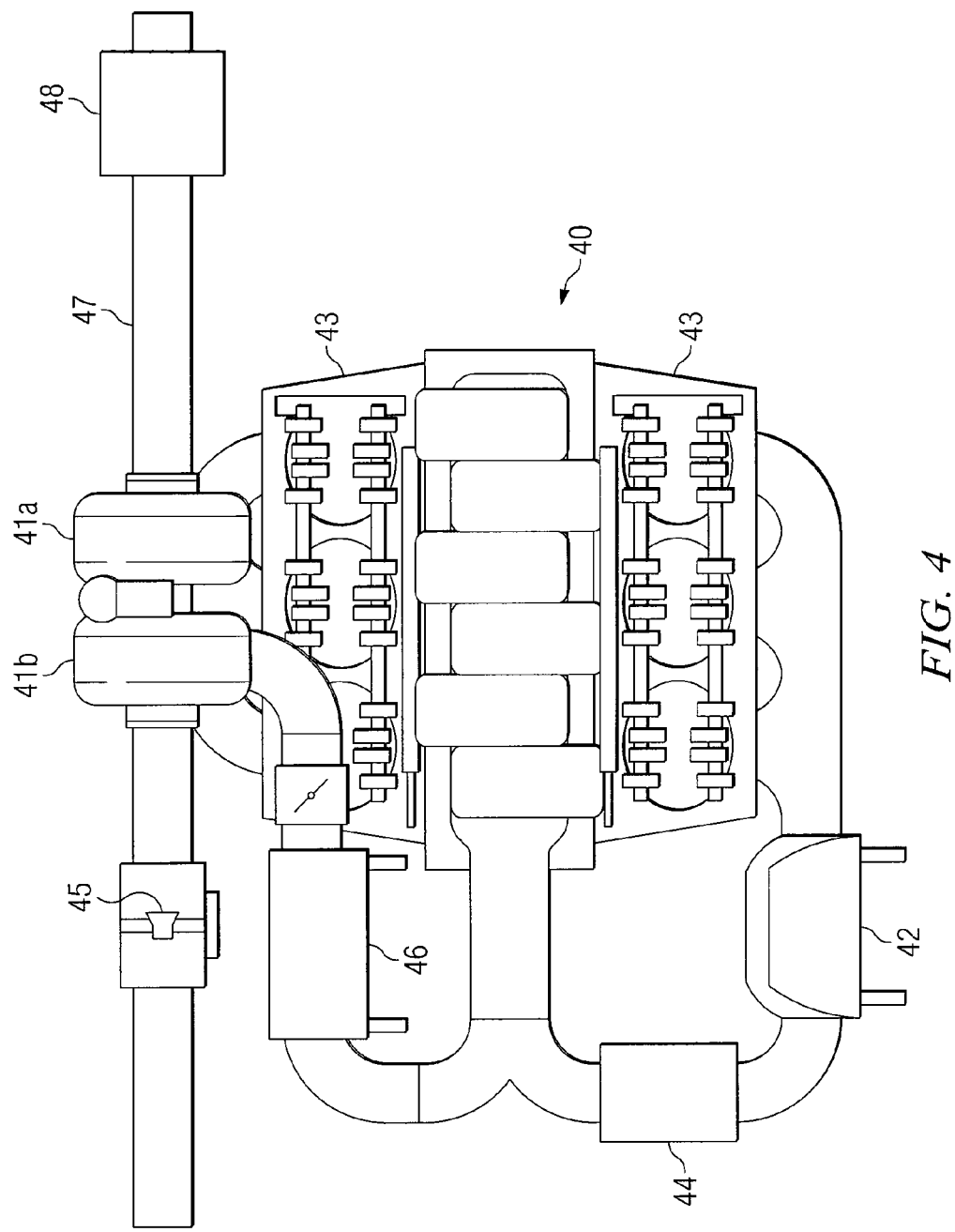
FIG. 4 illustrates an EGR-equipped engine with 50% dedicated EGR in a high pressure loop configuration.
Figure 5:
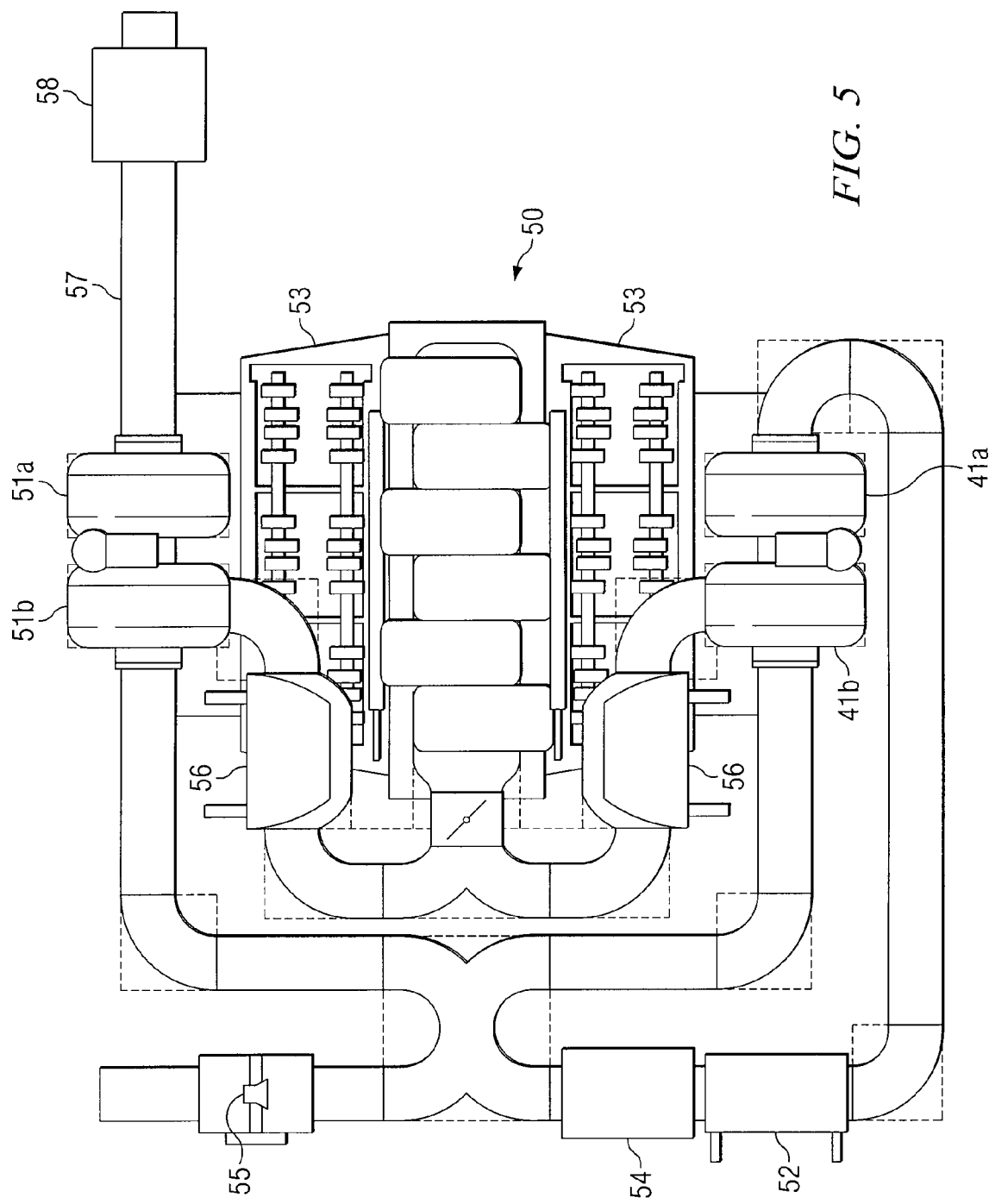
FIG. 5 illustrates an EGR-equipped engine with 50% dedicated EGR in a low pressure loop configuration.

FIGS. 4 and 5 illustrates engines having multiple dedicated EGR cylinders. Both FIG. 4 and FIG. 5 illustrate six-cylinder engines 40 and 50, respectively, with one bank of cylinders (three cylinders) used to generate EGR for the opposite bank. In these engines, the nominal amount of EGR is 50%, which is challenging for the engine to run.

FIG. 4 illustrates a high-pressure loop (HPL) EGR system, whereas FIG. 5 illustrates a low pressure loop (LPL) EGR system 50. In an HPL EGR-equipped engine 40, the exhaust to be recirculated is extracted upstream of the turbine 41a and routed to the engine intake downstream of the compressor 41b (post-compressor). In a LPL EGR-equipped engine 50, the exhaust to be recirculated is extracted downstream of the turbine 51a and introduced to the engine inlet upstream of the compressor 51b (pre-compressor). Both types of EGR systems 40 and 50 may use a cooler, such as EGR coolers 42 and 52. The EGR cooler assists in operating the engine at appropriate temperatures and mass flow rates.

In the case of both systems 40 and 50, for conditions at which the EGR tolerance is not high enough for the engine to remain stable with 50% EGR, the engine may be equipped with either a cam phasing system or other type of variable valve timing system to decrease the mass flow through the EGR cylinders. While continuing to run the dedicated EGR cylinders rich, a system that decreases the cylinder's volumetric efficiency allows the engine to be calibrated for EGR levels between 30% and 50%.

In the examples of FIGS. 4 and 5, engines 40 and 50 are equipped with dual cam phasers 43 and 53 for each bank of cylinders. For purposes of this description, "variable valve timing" (VVT) is used in a most general sense as a generic term for any piston engine technology that allows the lift, duration, timing, or phasing (some or all) of the intake or exhaust valves (or both) to be controlled while the engine is in operation.

In the case of the present invention, variable valve timing is used on the dedicated EGR cylinders to provide the capability of reducing the EGR mass flow by restricting flow through the dedicated EGR cylinders. Although the VVT (in the form of cam phasing) is illustrated in FIGS. 4 and 5 as serving all cylinders, in alternative embodiments, VVT could be implemented for only the dedicated EGR cylinders.

In the case of a cam phasing system, the overlap between the intake and exhaust valves can be increased to raise the level of in-cylinder residual and cut down on fresh air flow or the intake valve opening timing can be adjusted from its optimum to limit the amount of fresh air inducted.

For an engine equipped with some other type of variable valve timing system, the lift and/or duration of the intake valve events on the dedicated EGR engines can be adjusted to decrease the volumetric efficiency of the subject cylinders to reduce the mass flow and lower the EGR percentage in the engine.

Because the rich ($\Phi>1.0$) cylinders also generate high levels of CO, there also exists the potential to install a water-gas shift (WGS) catalyst in the EGR system to further increase the H2 level of the engine. Both engines 40 and 50 are equipped with a WGS catalyst 44 and 54, respectively, downstream their EGR coolers.

The WGS catalysts can be of several different compositions, but their main use is to convert the CO in the EGR system to H2 through the WGS reaction: $CO+H_2O \rightarrow H_2 + CO_2$. Because the dedicated EGR cylinders are run rich of stoichiometric, they will generate significant levels of CO, which is more favorable to the WGS reaction than typical, stoichiometric exhaust with low CO levels and high CO2 concentrations. Due to the limited ability of WGS catalysts to function at high temperatures, the engine is equipped with a pre-catalyst EGR cooler to reduce the exhaust temperatures to the required, high-efficiency levels.

Both engines 40 and 50 are further equipped with a mass air flow (MAF) sensor 45 and 55. After coolers 46 and 56 cool the air from the compressor. The exhaust into the tailpipe 47 and 57 is stoichiometric, and may be treated with conventional exhaust aftertreatment devices, such as a three-way catalyst (TWC) 48 and 58.

In sum, an engine having dedicated EGR, as high as 50%, can have its EGR tolerance improved by running dedicated cylinders rich of stoichiometric to generate CO and H2 in either low-pressure loop or high-pressure loop configuration. Running one or more dedicated EGR cylinders rich also improves fuel consumption and reduces emissions by improving burn rates changing the composition of the EGR gases and reducing pumping losses. Furthermore, running one or more dedicated EGR cylinders rich reduces the knock tendency through increased EGR tolerance and high octane additives (CO and H2), resulting in higher potential torque output from the engine and better full load fuel consumption.

As an alternative to running the dedicated EGR cylinder(s) rich, the EGR rate of the engine may be controlled by running some or all of the dedicated EGR cylinders lean of stoichiometric (with excess air). The additional O2 in the EGR will serve to reduce the effective EGR rate. A sensor, such as an EGO sensor, may be installed on the EGR loop, to assist in AFR control of the EGR loop.

Dedicated EGR cylinders simplify the EGR control of the engine, reduce or eliminate the need for complicated control systems, and also reduce the sensor count on the engine. Dedicated EGR cylinders improve transient response of engines running high levels of EGR by helping maintain EGR rates through transient events. The EGR rate of an engine with dedicated EGR cylinders can be controlled through a variable valve system, such as by cam phasing or variable lift/duration systems, by reducing the volumetric efficiency of the dedicated EGR cylinders when less EGR is required.

The addition of a water-gas shift catalyst in the EGR circuit of an engine with dedicated EGR cylinder running rich of stoichiometric can increase the hydrogen (H2) content of the EGR gas.

Referring again to FIG. 1, the EGR system has a control unit 105, which may be dedicated to EGR control or may be part of a more comprehensive engine control unit. Control unit 105 may be implemented with conventional processing and memory devices. For purposes of the various embodiments described herein, control unit 105 may be programmed to control the air-fuel ratio (AFR) as described above, such that the dedicated EGR cylinders may run rich or lean as desired for various engine operating conditions. Control unit 105 may also be programmed to implement various VVT schemes as described above. Thus, control unit 105 may be used to control the composition and/or amount of recirculated exhaust by adjusting the AFR or by implementing various VVT controls. EGR systems 40 and 50 may have similar control units.

What is claimed is:

1. A method of operating an internal combustion engine, the engine having an intake manifold and having multiple cylinders, comprising:
   operating at least one cylinder of the engine as a dedicated exhaust gas recirculation (EGR) cylinder, such that the exhaust from the at least one dedicated EGR cylinder is completely recirculated to the intake manifold, and such that none of the exhaust from the remaining cylinders is recirculated to the intake manifold;
   providing the engine with an exhaust gas recirculation loop in which recirculated exhaust flows from the at least one dedicated EGR cylinder into the intake manifold without fluid communication to the exhaust exiting the engine;

wherein the at least one dedicated EGR cylinder and the remaining cylinders share the same intake manifold, such that the recirculated exhaust is combined with fresh air in the intake manifold;

using a water-gas shift catalyst in the loop to increase the hydrogen level of the recirculated exhaust received into the intake manifold;

controlling the amount of the recirculated exhaust, at least in part, by means of variable valve timing of the at least one dedicated EGR cylinder;

operating the at least one dedicated EGR cylinder at a rich air-fuel ratio that is rich of stiochiometric;

operating the at least one non dedicated cylinder at a stoichiometric air-fuel ratio; and controlling the composition of the recirculated exhaust by controlling the rich air-fuel ratio provided to that cylinder;

wherein the step of controlling the composition is performed to produce exhaust gas from the at least one dedicated EGR cylinder having levels of hydrogen predetermined to provide a desired rate of fuel consumption by all cylinders in accordance with a predetermined relationship between the rich air-fuel ratio and fuel consumption.

2. The method of claim 1, wherein half of the engine's cylinders are dedicated EGR cylinders.

3. The method of claim 1, wherein the variable valve timing is implemented with cam phasing.

4. The method of claim 1, wherein the variable valve timing is implemented with variable valve lift or variable valve duration.

5. The method of claim 1, wherein the exhaust is recirculated in a high pressure loop configuration.

6. The method of claim 1, wherein the exhaust is recirculated in a low pressure loop configuration.

7. The method of claim 1, further comprising the step of using an exhaust gas cooler in the exhaust gas recirculation loop to cool the recirculated exhaust.

8. The method of claim 1, wherein the proportion of the total exhaust from the engine that is recirculated is in the range of 30% to 50%.

9. The method of claim 1, further comprising treating the exhaust from the engine with a three-way catalyst.

10. The method of claim 1, wherein the step of controlling the composition is further performed to actively control the knock resistance of all cylinders.

11. The method of claim 1, wherein the step of controlling the composition is further performed to actively control the combustion burn rates of all cylinders.

12. The method of claim 1, wherein the step of controlling the composition is further performed to actively control the engine's transient response through transient events.

13. The method of claim 1, wherein the step of controlling the composition is further performed to actively control the octane content of the recirculated exhaust.

14. The method of claim 1, wherein the step of controlling the composition is performed to actively control the dilution tolerance of all cylinders.

* * * * *